Patented May 1, 1951

2,550,760

UNITED STATES PATENT OFFICE 2,550,760

HYDRAULIC FLUID COMPOSITIONS

John W. Bishop, Roselle, N. J., assignor to Tide Water Associated Oil Company, Bayonne, N. J., a corporation of Delaware No Drawing. Application May 27, 1947, Serial No. 750,895

7 Claims. (Cl. 252—79)

The present invention relates to the production of novel compositions suitable for use as hydraulic fluids and for certain lubricating purposes. More particularly, the invention relates to novel compositions especially adapted for usage as hydraulic fluids under conditions of operation requiring a fluid composition having an exceptionally high viscosity at elevated temperatures and relatively low viscosity at low temperatures, a high viscosity index, a low pour point, a substantially high flash point, and the necessary amount of lubricating properties to prevent metal-to-metal contact between operating parts of the hydraulic system.

It has been found that the esters of aliphatic dibasic acids, particularly those esters in which the esterifying radical is a branched chain alkyl radical, have certain of the foregoing desired properties required in a hydraulic fluid. For example, certain of the esters of aliphatic dibasic acids have a high viscosity index, a low pour point, a substantially high flash point, are of lubricant viscosity at about 100° F. and at 210° F., and possess lubricating properties. Among the aliphatic dibasic acids suitable for the preparation of the esters used in making the hydraulic compositions as embodied herein, there may be mentioned the series of saturated aliphatic dicarboxylic acids, or mixtures thereof, that include acids such as malonic, succinic, glutaric, adipic, pimelic, suberic, azelaic, sebacic, and the like. The ester acids may be made by any of the methods for producing esters known to the art.

Broadly speaking, the present invention is based upon the discovery that by incorporating a minor proportional amount by weight of a polymerized acrylic acid ester or esters of substituted acrylic acids into a base material comprising a suitable ester of an aliphatic dicarboxylic acid, novel compositions may be provided to meet certain hydraulic fluid requirements that are not obtainable by the sole use of an aliphatic dicarboxylic acid ester. Thus, for example, for certain heavy duty requirements, liquid hydraulic fluids are desired that possess a higher viscosity at 100° F. and 210° F. or even higher than a specific ester of the aforedescribed dicarboxylic acid esters without substantially decreasing the viscosity index of the ester, and yet maintain an effectively low pour point, e. g., below about —30° F. for the hydraulic fluid. By dissolving acrylic acid ester polymers in such aliphatic dicarboxylic acid esters, it has been found that compositions may be provided that are highly effective for hydraulic use, and, depending on the particular base material and polymer, and amounts thereof employed, the properties of the hydraulic fluid may be varied to meet specific requirements over a wide range of operating conditions.

As will be appreciated by those skilled in the art, the ester of aliphatic dicarboxylic acids employed as the base material will depend considerably on the particular properties desired and the usage to which the hydraulic fluid is to be subjected under operating conditions. Similarly, the amount of the base material employed in relationship with the acrylic ester polymer dissolved therein, and the particular polymer employed, is also somewhat dependent on the properties desired and the ultimate usage to which the blended composition is to be subjected. Hence, in broad aspect, the novel compositions comprise an ester of an aliphatic dicarboxylic acid having dissolved therein a polymeric ester of the acrylic series, but, in preferred form, the novel compositions comprise a major proportional amount by weight, as for example, at least about 90% by weight of the dicarboxylic acid ester having dissolved therein an amount of the acrylic polymer effective to provide a hydraulic fluid having the desired characteristics.

With further reference to the base materials employed in my novel compositions, these materials must not only have effective solvent action on the polymeric acrylic esters employed, but should also possess lubricating properties and additional characteristics suitable for producing a hydraulic fluid of the desired properties. Although the particular base material employed depends considerably on intended usage and performance characteristics required, the compositions of the present invention are especially adaptable for use as hydraulic fluids wherein compositions of a relatively low viscosity at low temperatures and high viscosity at elevated temperatures, e. g., up to about 210° F., are required, while at the same time maintaining an exceptionally low pour point, and a substantially high viscosity index. For such usages, the diesters of the long chain aliphatic dicarboxylic acids, e. g., sebacic acid, and more particularly, the dialkyl esters of such acids have been found particularly suitable as such base materials usually possess high viscosity indices, low pour points, and the like. In general, for usage in preparing highly suitable hydraulic fluids as embodied herein, it is preferred that the base materials, i. e., the ester of an aliphatic dicarboxylic acid, should be liquid and possess lubricating properties, a flash point of at least about 350° F. and preferably higher, have sufficient solvent action for polymeric esters of the acrylic series, a high viscosity index, a low pour point, and relatively high viscosities at about 100° F. and at 210° F. Base materials exemplified by esters such as di-2-ethyl hexyl sebacate have been found to be particularly suitable, and hence, in my description of the invention, the invention is described in illustrative embodiment with particular reference to di-2-ethyl hexyl sebacate having the following properties as the base material:

*Di-2-ethyl hexyl sebacate*

| | |
|---|---|
| Viscosity at 100° F. (S. U. S.) | 66 |
| Viscosity at 210° F. (S. U. S.) | 37 |
| Pour point | Below —30° F. |
| Flash °F. (Cleveland open cup) | 420 |
| Viscosity index (210° F. to 100° F. range) | 156 |

As stated hereinbefore, the novel compositions embodied herein comprise a suitable ester of an aliphatic dicarboxylic acid having dissolved therein a minor proportional amount of an acrylic acid ester polymer, the amount of polymer employed being varied as desired to obtain satisfactory performance of the compounded composition depending upon the usage and conditions to which it is to be subjected. In general, the polymers embodied for use herein are those of the type obtainable by polymerizing acrylic acid esters or esters of substituted acrylic acids. For example, such polymers may be prepared by esterifying acrylic acid, acrylic acid homologues, or substituted acrylic acids with normal or isomeric alcohols, as for example, saturated alcohols containing from about 4 to 18 carbon atoms per molecule. A preferred type of such polymerized materials are the polymerized acrylic acid esters of the series commercially available under the name "Acryloid" that generally comprise polymers of the acrylic acid esters, e. g., about 50% by weight, in a liquid vehicle therefor. More specific examples of polymerized materials of this type are Acryloid HF–860 consisting of a mixture of equal parts of the octyl and decyl esters of the methacrylic acid and having a molecular weight of about 15,000, Acryloid HF–145, Acryloid 150, Acryloid 710 and Acryloid 150 being understood to be a co-polymer of methacrylic acid esters containing a lauryl radical, and Acryloid 710 being a similar type of co-polymer but of higher molecular weight than Acryloid 150.

In order to further describe my invention and to illustrate the adaptability of the invention in preparation of novel compositions particularly suitable for the purposes as described hereinbefore, the following illustrative examples are set forth:

*Example I*

For a particular requirement of a heavy duty hydraulic fluid, it was desired to obtain a composition having a viscosity of 95–100 Saybolt Universal seconds at 210° F., a viscosity of about 10,000 S. U. S. at —30° F., a stable pour point of —30° F. as a maximum, a high flash point of at least about 400° F., a substantially high viscosity index, e. g., about 150, and possessing sufficient lubricating properties to prevent metal-to-metal contact, between operating parts of the hydraulic system. In view of the extreme viscosity index requirement (over a range of 210° F. to —100° F.) and the limit on viscosity at —30° F., compositions based on use of substantial proportional amounts of commercially available mineral oils or fractions thereof appeared unsuitable. It was found, however, that di-2-ethyl hexyl sebacate possesses certain of the aforesaid desired properties in that it has a stable pour point below —30° F., a viscosity index of about 156, a flash point of about 420, and has sufficient lubricating properties. However, di-2-ethyl hexyl sebacate was not in itself suitable in that the viscosity thereof at 210° F. was too low. Hence, in order to modify di-2-ethyl hexyl sebacate to meet the aforedescribed requirements, it was essential to substantially increase the viscosity at 210° F., while maintaining the stable pour point at less than about —30° F., and without substantially affecting the viscosity index. In order to thus modify di-2-ethyl hexyl sebacate, a blend was prepared by dissolving about 5.53% of the solid polymeric acrylic acid ester of Acryloid HF–145 in di-2-ethyl hexyl sebacate. The composition was prepared by dissolving the desired amount by weight of polymer, thinned with toluol in the di-2-ethyl hexyl sebacate, and evaporating off the toluol whereby the aforedescribed composition was obtained. The compounded composition had the properties set forth hereinafter in comparison with di-2-ethyl hexyl sebacate:

| | Di-2-ethyl hexyl Sebacate | Compounded Composition |
|---|---|---|
| Viscosity at 100° F. (S. U. S.) | 66 | 306 |
| Viscosity at 210° F. (S. U. S.) | 37 | 86.8 |
| Viscosity at —30° F. | about 3,800 | about 7,000 |
| Viscosity Index | 156 | 160 |
| Stable Pour Point °F. | below —30 | below —30 |

The foregoing data clearly shows the improved properties imparted to di-2-ethyl hexyl sebacate by dissolving therein a minor proportional amount of the acrylic acid ester polymer in that the viscosity at 100° F. and at 210° F. was very markedly increased while maintaining the pour point at less than —30° F., and, in spite of the marked desired increase in viscosity at 100° F. and at 210° F., the viscosity index was raised from 156 to 160.

*Example II*

A composition was prepared in the same manner as set forth in Example I except that 8.3% by weight of the acrylic acid ester polymer was dissolved in di-2-ethyl hexyl sebacate. The properties of the compounded composition were as follows, and for convenience, are shown in comparison with di-2-ethyl hexyl sebacate:

| | Di-2-ethyl hexyl Sebacate | Compounded Composition |
|---|---|---|
| Viscosity at 100° F. (S. U. S.) | 66 | 543 |
| Viscosity at 210° F. (S. U. S.) | 37 | 139.5 |
| Pour Point °F. | below —30 | below —30 |
| Viscosity Index | 156 | 150 |

The foregoing results clearly show the still marked improvement in the viscosity of di-2-ethyl hexyl sebacate at elevated temperatures by incorporating therein a higher amount of the acrylic acid ester polymer than employed in Example I. As is apparent, the viscosity of di-2-ethyl hexyl sebacate was increased from 66 to 543 Saybolt Universal seconds at 100° F., and from 37 to 139.5 at 210° F. In spite of these very marked increases in viscosity, the compounded composition still had a stable pour point less than —30° F., and a substantially high viscosity index of 150 over the 210° F. to 100° F. range. Moreover, the viscosity of the blended composition at —30° F. was about 11,000 seconds which is exceedingly low for a composition of about 140 Saybolt Universal seconds viscosity at 210° F.

Although certain specific proportional amounts of acrylic acid ester polymers to base materials have been set forth in the foregoing examples, it will be apparent to those skilled in the art that such concentrations are illustrative and not limitative as the concentrations may be varied to provide compositions having predetermined desired properties for satisfactory performance in intended use. Thus, for example, as is illustrated by the foregoing examples, by increasing the concentration of the acrylic polymer, higher viscosities at elevated temperatures result without materially or deleteriously affecting the viscosity index of the compounded compositions, while retaining effectively low pour points in spite of the material increases in viscosities at elevated temperatures. In fact, depending on the amount of polymer employed, under certain conditions, the viscosity index is actually increased even though the viscosities at elevated temperatures are materially increased as compared to the base material. Thus, in broad aspect, the present invention comprises compositions containing an effective amount of acrylic acid ester polymers dissolved in suitable diesters of aliphatic dicarboxylic acids as described hereinbefore to improve the performance characteristics of the diesters. Although in some cases it may be desired to employ more than 10% by weight of the polymer dissolved in the base material, highly satisfactory compositions are generally provided by employing the polymer in concentrations not exceeding about 10%. Hence, in preferred embodiment, the present invention relates to compositions containing the aforedescribed polymeric esters of the acrylic series dissolved in at least about 90% by weight of the base material.

Although the novel compositions as embodied herein essentially comprise the aforedescribed acrylic acid ester polymers dissolved in a suitable ester of an aliphatic dicarboxylic acid, under certain conditions, as for certain specific applications, it may be desired to impart additional desired properties to the compositions. Thus, depending on intended usage, the composition may be further modified by incorporating certain ingredients, such as anti-oxidants, anti-corrosive agents, and the like. Similarly, for certain applications and for economical reasons, it may be desired to incorporate diluents into the composition, and, for such a purpose, suitable oils, e. g., mineral oils, may be employed. However, although such additive ingredients may be incorporated without departing from the spirit of the invention, the total concentration thereof should, for most instances, preferably be maintained as low as possible in order that the desired properties of the polymer-diester composition will not be materially or deleteriously affected.

Obviously, many modifications and variations of the invention, as hereinbefore set forth, may be made without departing from the spirit and scope thereof and therefore only such limitations should be imposed as are indicated in the appended claims.

I claim:

1. A liquid heavy duty hydraulic fluid, comprising at least about 90% by weight of di-2-ethyl hexyl sebacate and a polymerized ester of an acrylic acid having a molecular weight of about 15,000 in an amount sufficient to more than double the Saybolt Universal seconds viscosity at 210° F. of said sebacate while maintaining the viscosity index of said sebacate between about 150 and 160, said polymerized ester being further characterized by containing as an alcohol residue a saturated hydrocarbon group of about 4 to about 18 carbon atoms.

2. A liquid heavy duty hydraulic fluid comprising at least about 90% by weight of a liquid dialkyl ester of sebacic acid having a flash point of at least 350° F. and a polymerized ester of an acrylic acid having a molecular weight of about 15,000 in an amount sufficient to more than double the Saybolt Universal seconds viscosity at 210° F. of said dialkyl ester without substantially changing the viscosity index of said dialkyl ester, said polymerized ester being further characterized by containing as an alcohol residue a saturated hydrocarbon group of about 4 to about 18 carbon atoms.

3. A liquid heavy duty hydraulic fluid comprising at least about 90% by weight of a liquid dialiphatic ester of a saturated long chain dicarboxylic acid having a flash point of at least 350° F. and a polymerized ester of an acrylic acid having a molecular weight of about 15,000 in an amount sufficient to more than double the Saybolt Universal seconds viscosity of said dialiphatic ester at 210° F. without substantially changing the viscosity index thereof, said polymerized ester being further characterized by containing as an alcohol residue a saturated hydrocarbon group of about 4 to about 18 carbon atoms.

4. A hydraulic fluid, as defined in claim 3, wherein the dialiphatic ester has a viscosity index of about 150 to 160 and the polymerized ester is present in an amount sufficient to more than double the Saybolt Universal seconds viscosity of said aliphatic ester at 210° F. while maintaining the viscosity index between about 150 and 160.

5. A liquid heavy duty hydraulic fluid, as defined in claim 3, wherein the dialiphatic ester is a liquid branched chain dialkyl ester of a saturated long chain dicarboxylic acid.

6. A liquid heavy duty hydraulic fluid, as defined in claim 3, wherein the dialiphatic ester is di-2-ethylhexyl sebacate.

7. A liquid heavy duty hydraulic fluid comprising at least about 90% by weight of a liquid dialiphatic ester of a saturated long chain dicarboxylic acid having a flash point of at least 350° F. and a polymerized ester of an acrylic acid in an amount sufficient to at least double the Saybolt Universal seconds viscosity of said dialiphatic ester 210° F. without substantially changing the viscosity index thereof, said polymerized ester being further characterized by containing as an alcohol residue a saturated hydrocarbon group of about 4 to about 18 carbon atoms.

JOHN W. BISHOP.

REFERENCES CITED

The following references are of record in the file of this patent:

UNITED STATES PATENTS

| Number | Name | Date |
|---|---|---|
| 1,976,716 | Custer | Oct. 16, 1934 |
| 2,104,408 | Wiezevich | Jan. 4, 1938 |
| 2,407,954 | Fenske et al. | Sept. 17, 1946 |
| 2,408,983 | Kollen | Oct. 8, 1946 |
| 2,411,150 | Evans et al. | Nov. 19, 1946 |
| 2,417,281 | Wasson et al. | Mar. 11, 1947 |
| 2,467,147 | Morway et al. | Apr. 12, 1949 |

FOREIGN PATENTS

| Number | Country | Date |
|---|---|---|
| 524,937 | Great Britain | Mar. 11, 1947 |

OTHER REFERENCES

Fain: "Brake Fluids Face a Lively Future," in Chemical Industries, December 1946, pages 1012–1015.